United States Patent
Basore et al.

(10) Patent No.: US 8,599,879 B1
(45) Date of Patent: Dec. 3, 2013

(54) EXTERNAL APPLICATION GATEWAY

(75) Inventors: David Basore, Little Silver, NJ (US);
David Burhans, Dublin, OH (US);
Chung-Man Lee, Westerville, OH (US);
Kathy Lowther, Hazlet, NJ (US); Sita Menon, West Windsor, NJ (US); Gary A. Munson, Little Silver, NJ (US); Peter L. Ng, Freehold, NJ (US); Jeffri Frontz, Columbus, OH (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1338 days.

(21) Appl. No.: 11/290,206

(22) Filed: Nov. 30, 2005

(51) Int. Cl.
*H04L 29/06* (2006.01)
*H04L 12/66* (2006.01)
*H04L 29/12* (2006.01)

(52) U.S. Cl.
USPC ............ 370/486; 370/313; 370/401; 370/352

(58) Field of Classification Search
USPC .................................................. 370/350, 352
See application file for complete search history.

(56) References Cited

U.S. PATENT DOCUMENTS

| | | | |
|---|---|---|---|
| 6,363,411 B1 * | 3/2002 | Dugan et al. ................. | 709/202 |
| 6,404,870 B1 | 6/2002 | Kia et al. | |
| 6,604,139 B1 | 8/2003 | Sajina et al. | |
| 6,678,250 B1 | 1/2004 | Grabelsky et al. | |
| 6,856,613 B1 | 2/2005 | Murphy et al. | |
| 6,904,132 B2 | 6/2005 | Reynolds | |
| 6,940,950 B2 | 9/2005 | Dickinson et al. | |
| 7,099,301 B1 * | 8/2006 | Sheu ............................. | 370/352 |
| 7,496,625 B1 * | 2/2009 | Belcher et al. ................ | 709/204 |
| 2002/0054588 A1 * | 5/2002 | Mehta et al. ................... | 370/352 |
| 2003/0165121 A1 * | 9/2003 | Leung et al. ................... | 370/313 |
| 2004/0008837 A1 * | 1/2004 | Sylvain ..................... | 379/265.09 |
| 2004/0028080 A1 * | 2/2004 | Samarasinghe et al. ...... | 370/486 |
| 2004/0121765 A1 * | 6/2004 | Idnani et al. ................ | 455/422.1 |
| 2004/0121775 A1 * | 6/2004 | Ropolyi et al. ............... | 455/445 |
| 2005/0058125 A1 * | 3/2005 | Mutikainen et al. .......... | 370/354 |
| 2005/0152336 A1 * | 7/2005 | Bratt et al. ..................... | 370/352 |
| 2006/0067274 A1 * | 3/2006 | Gillespie et al. .............. | 370/331 |
| 2006/0227766 A1 * | 10/2006 | Mickle et al. ................ | 370/356 |

* cited by examiner

*Primary Examiner* — Asad Nawaz
*Assistant Examiner* — Jason Harley

(57) ABSTRACT

A telecommunications system uses an external application gateway (EAG) in communication with a network call control element and external server systems for controlling calls. The telecommunications system further includes a session initiation protocol (SIP) proxy, an intelligent application proxy, and an intelligent application call control. The EAG communicates with a network call control element of a packet network and a third party application server for controlling calls. The external application gateway controls the flow of information between the network call control element and the third party application server, performing such functions as modifying or stripping out network-proprietary information with delivery of the modified messages to the third party application server, keeping track of call state information and associating messages with specific calls, verifying that the third party application server is making only allowed requests, and limiting traffic volumes.

10 Claims, 3 Drawing Sheets

EXTERNAL APPLICATION GATEWAY

FIELD

The embodiments relate to telecommunications systems and methods using an external application gateway with a Session Initiation Protocol (SIP)-based interface between third party server systems and network call control elements of packet networks for the purpose of controlling calls.

BACKGROUND

Packet switched networks can route data traffic or packets of data using Internet Protocol networks. Voice over Internet Protocol (VoIP) allows voice traffic (e.g., telephone calls) to be carried over an Internet Protocol (IP) network between two telephones, computers, or similar communication devices.

The early stages of VoIP networks supported basic calls without any features. Such a VoIP network would typically have a call control element or simple softswitches responsible for basic routing and call detail recording. Later, vertical features such as call forwarding, incoming call screening, or click-to-dial were supported through the use of application logic resident on network elements such as more sophisticated softswitches or application servers. Advanced services such as Toll-Free or Virtual Private Networks or Pre-Paid Calling Card are now being supported in VoIP networks through the use of network-based application servers.

An alternative to the use of network-internal application servers for service and feature call control is the use of $3^{rd}$ party, i.e., network-external, application servers, in which case some kind of gateway at the edge of the network is required to suitably manage the exchange of information between the external application server and the network. A gateway that uses the Session Initiation Protocol (SIP) to interface to both the call control element inside the network and to the external application server outside the network has many desirable characteristics such as network architectural simplicity, interface simplicity, and the opportunity for the $3^{rd}$ party application service provider to utilize Session Initiation Protocol (SIP)-based application server equipment that is now common in the industry.

Such a Session Initiation Protocol (SIP)-based 'external application gateway' must address the control or regulation of sensitive or proprietary information that can be communicated from a particular network to an external application server. The SIP must ensure that control information coming from the external application server is within the scope of control allowed for that particular external application server and is applied to calls that external application server is permitted to control. The SIP must attach network-proprietary information to control messages from the external application server that is needed by other network-internal elements. Current descriptions of gateway support for external application servers do address any specifics of how a SIP-based gateway controls the information flow between the external application server and the network call control element.

Thus, a need exists for a telecommunications system and method to provide application-level control of the exchange of information through a gateway using SIP both toward external application servers and toward the call control element of a particular network.

The embodiments meet these needs.

SUMMARY

The embodiments relate to telecommunications systems using an external application gateway, which is in communication with a third party application server system and a network call control element of a packet network, for the purpose of controlling calls.

The present telecommunications system includes an external application gateway (EAG) that communicates with a network call control element (CCE) of a packet network and a third party application server (AS) for controlling calls and for modifying call message content. The external application gateway (EAG) includes: a Session Initiation Protocol (SIP) proxy, an intelligent application proxy, and an intelligent application call control that can function to determine information flow to and from the external application gateway. The third party application server can control allowed phone calls, or allowed functions requested of the packet network, for example, requesting the packet network to monitor for dual tone multi-frequency (DTMF) digits input from the caller.

An embodiment can include a telecommunications method for identifying and processing a Session Initiation Protocol (SIP) message at the external application gateway (EAG) to a third party application server from a network call control element. The method includes: modifying the Session Initiation Protocol message by stripping out proprietary information for a particular call and creating a call identifier specific to the call, translating network addresses, for example IP addresses or SIP addresses, to external addresses, creating or modifying call state information for each received message in the external application gateway (EAG), and sending the modified Session Initiation Protocol (SIP) message to the third party application server for communication.

The embodiments can include telecommunications methods for identifying and processing a Session Initiation Protocol (SIP) message at the external application gateway (EAG) from a third party application server to a network call control element. The methods entail examining the received message to verify the received message is from an allowed source, identifying the particular call with an associated message, and confirming that the message type and content are allowed. The methods continue by inserting network-proprietary information and translating addresses (such as IP addresses or SIP addresses) to internal packet network addresses. The call state information is then created or modified before sending the modified Session Initiation Protocol (SIP) message to the call control element in the packet network.

BRIEF DESCRIPTION OF THE DRAWINGS

The detailed description will be better understood in conjunction with the accompanying drawings as follows.

Figure 1:
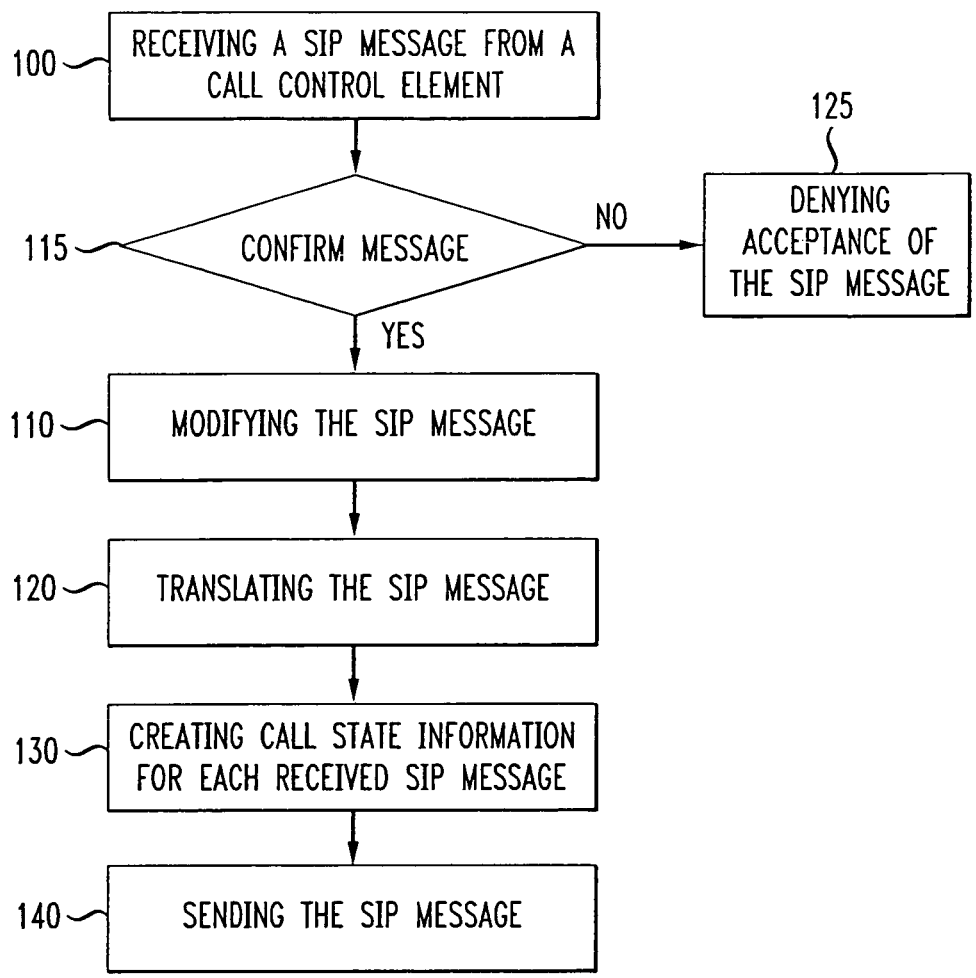
FIG. 1 depicts an embodiment of a telecommunication method for processing a session initiated protocol (SIP) message to a third party application server.

The present embodiments are detailed below with reference to the listed Figures.

DETAILED DESCRIPTION OF THE EMBODIMENTS

Before explaining the presently disclosed embodiments of the invention in detail, it is to be understood that the invention is not limited to the particular embodiments and that the invention can be practiced or carried out in various ways.

The embodiments relate to telecommunications systems using external application gateways with a real-time protocol interface, such as a Session Initiation Protocol (SIP) or an external server system for controlling calls.

The methods and system can be used for network protection. The embodiments permit a Session Initiation Protocol (SIP) to be used for external call control in a network, which provides a particular network with a level of protection and regulation regarding their communication of sensitive or proprietary information.

The embodiments of the telecommunications system can include a communication system with media servers for exchange of information; a packet network in communication with the server systems that functions, for example, for call control, call routing, and flow of communications information; an external application gateway for such functions as application-level screening and modifying of communication information; and a third party application server adapted for controlling delivery of calls to media endpoints that are inside and outside of the packet network system.

The telecommunications system can include a packet network, such as an Internet Protocol (IP) network or a Voice over Internet Protocol (VoIP) network. The packet network includes a border element located between the call control element of the packet network and the communication system. The border element of the packet network communicates with the communication system external to the packet network, such as, an external media server. The packet network includes a call control element (CCE) that is in communication with the external application gateway.

The external application gateway (EAG) of the telecommunications system presents an interface to the call control element (CCE) of the packet network and can function as an internal application server to the call control element. The external application gateway can be a validated component of the packet network. Also, the external application gateway can interface to the call control element of the packet network and a third party application server (AS) using a Session Initiation Protocol (SIP)-based interface for service call control. Accordingly, the external application gateway can present an interface to the third party application server and can function as a call control element to the third party application server.

The external application gateway (EAG) of the telecommunications system includes a Session Initiation Protocol (SIP) proxy, an intelligent application proxy, and an intelligent application call control. The SIP proxy utilizes the Session Initiation Protocol (SIP) and performs as a SIP User Agent endpoint toward a network call control element (CCE) and third party application server.

The intelligent application proxy of the external application gateway includes business logic applications to determine information flow between the third party application server and the network call control element. The intelligent application proxy can include business logic for adding or removing information for calls made through the packet network. This additional information can include: call detail information, signaling history information, encapsulated integrated services digital network user part (ISUP) information, and combinations thereof.

The intelligent application call control of the external application gateway contains information on call state, such as the elapsed time of the current call, information on a call leg of a call, characteristics of a media session for a call leg of a call, and knowledge of an association of the call legs for each call. The intelligent application call control can be adapted for screening and security functions to restrict third party application server interactions with the packet network.

A third party application server can be included in the telecommunications system and can be in communication with the external application gateway. The third party application server can be adapted for controlling calls.

The third party application server is external to the packet network and can include service logic, which comprises prepaid calling service, 800 toll free calling services, Voice over Internet Protocol telephony services, content based services, teleconferencing services, virtual private network services, commercial credit card calling card services, directory assistance, operator service, and combinations thereof.

The telecommunications system can include a communication system with a media server. Examples of a communication system can be at least one public switched telephony network, a Voice over Internet Protocol (IP) network, other similar communications networks, or combinations thereof.

The embodied telecommunications system includes the ability to deliver calls to media endpoints or server systems which are located inside or outside of a particular packet network. Examples of packet networks can be Internet Protocol (IP) and Voice over Internet Protocol (VoIP) for the delivery of data information and voice messages, respectively.

The embodiments can include telecommunications methods for identifying and processing a Session Initiation Protocol (SIP) message to a third party application server from a network call control element. The method includes the steps of modifying the Session Initiation Protocol (SIP) message, for example, by stripping out proprietary information for a particular call and creating a call identifier specific to the call. Network-internal addresses are translated to external addresses. The method can include creating call state information for each received message in the external application gateway as well as modifying the call state information for each received message in the external application gateway. The modified Session Initiation Protocol (SIP) message is sent to the third party application server for communication.

The embodied methods can include verifying that a Session Initiation Protocol (SIP) message received by the external application gateway from an external source is from an authorized source, for example by examining the IP or SIP address information. The methods continue by confirming that a SIP message received by the external application gateway from the third party application server is an allowed SIP message type with allowed information. The method includes associating the call identifier of the received message with an existing call known by the external application gateway and stripping the call identifier from the received message. The external application gateway can verify that IP address information in the media description received from the third party application server. For example, the external application gateway can verify if the media description in the Session Description Protocol used by the Session Initiation Protocol matches the description previously sent to the third party application server for that call. Call information can be created or inserted into the received message. Examples of call information include call detail information, signaling history information, encapsulated integrated services digital network user part (ISUP) information, and combinations thereof. The methods can conclude by creating as well as modifying call state information for each received message in the external application gateway.

The embodiments permit using the external application gateway for rejecting at least one packet from an unauthorized external source and denying service. For example, a low level security component can be included with the external application gateway for rejecting at least one packet from an unauthorized external source to the packet network and, then, denying a service attack. Also, the low level security component can be used to isolate the external source from the packet network.

The embodiments permit using the external application gateway for rejecting at least one packet from an external source and denying service by screening the packet based on business agreements. For example, screening the packet based on agreed-upon traffic volumes, the number of call legs allowed on a call, or whether the third party application server is permitted to request the network to perform monitoring for dual tone multi-frequency (DTMF) digits input from the calling party on a call.

With regard to the figures, FIG. 1 depicts an embodiment of a telecommunication method of for processing a session initiated protocol (SIP) message to a third party application server. The method begins by receiving a SIP message from a call control element of a packet network (100). The SIP message can be received by an intelligent application call control of an external application gateway. The intelligent application call control can use traffic based controls. The traffic based controls can be volume based, call leg based, or dual tone multi-frequency data based. The intelligent application call control can use a control that controls requests the third party application server to perform a dual tone multi-frequency data analysis of the existing call.

The method can entail a confirmation step (115). The confirmation step can entail determining if the SIP message is from the third party application server and/or if the SIP message is an allowed message type with allowed information. The allowed message type can be determined by using business agreements of users in the packet network indicating allowed message types.

The methods can entail denying acceptance of the SIP message from a source unknown to the intelligent application call control (125). If the SIP message is confirmed, the methods can entail associating an existing call known by the call control element with the call identifier and creating call information on the existing call and inserting the call information in the SIP message. Examples of call information include call detail information, signal history information, encapsulated integrated service network information, and combinations thereof. Further, if the SIP message is confirmed, the address related to the SIP message can be translated to the session initiated protocol address. The translation can be performed using internet protocol information from a media description of the SIP message.

Continuing with FIG. 1, the methods can entail modifying the SIP message by removing proprietary network information and inserting a call identifier (110). The SIP message is translated into an authorized external internal protocol address or a session initiated protocol address (120). Call state information is created for each SIP message received by the call control element (130). The methods then entail sending the SIP message with call identifier and call state information to the third application server (140).

Figure 2:
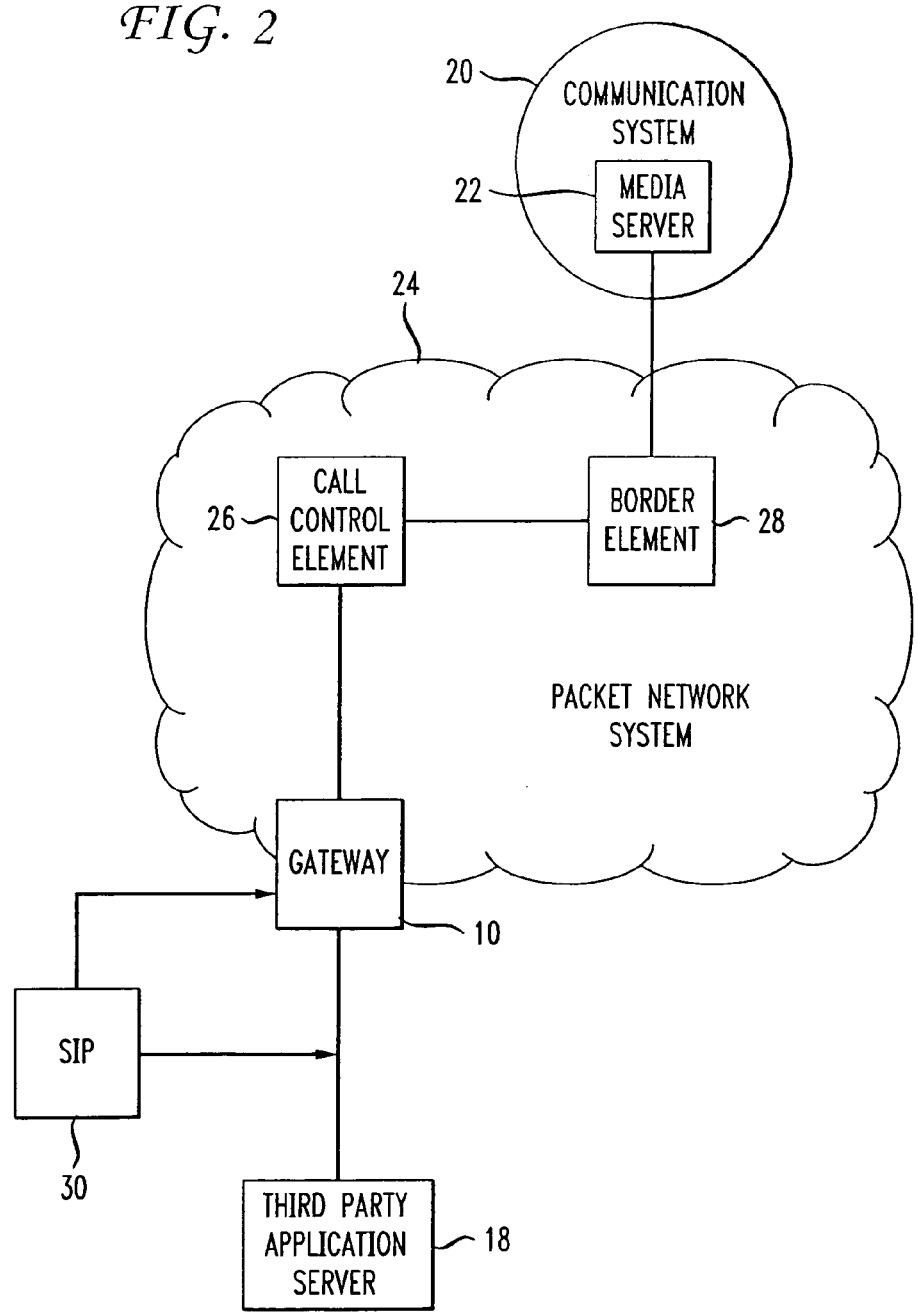
FIG. 2 depicts an embodiment of a telecommunications system for regulating access and delivery of communications to media endpoints that are inside or outside of packet networks.

FIG. 2 depicts an embodiment of a telecommunications system for regulating access and delivery of communications to media endpoints that are inside or outside of packet networks. The telecommunications systems includes a communication system (20) that can include a media server (22) for interactions with a packet network system (24) that accesses an external application gateway (10) for communication with a third party application server system (18). The packet network system (24) can be protected in an internal internet protocol network and can include a border element (28) for regulating information communicated between the communication system and the packet network system. The packet network can include a call control element (26) that communicates with the external application gateway (10) to regulate access and delivery of information to a third party application server (18). The Session Initiation Protocol (SIP) (30) can be used for interfacing the external application gateway (10) with the third party application server (18) and with the call control element (26) for external call control of the packet network.

An external application gateway usable for regulating access and delivery of information communicated between a third party application server and a packet network system. The external application gateway can include a Session Initiation Protocol (SIP) proxy, an intelligent application proxy, and an intelligent application call control. The Session Initiation Protocol (SIP) proxy utilizes the Session Initiation Protocol (SIP) and functions as a SIP User Agent endpoint toward the network call control element and toward the external application server. The intelligent application proxy can include call logic to handle insertion, deletion and translation of message content, such as call detail information, signaling history, and encapsulated integrated services digital network (ISUP) user part information. The intelligent application call control keeps track of call state, elapsed time of the current call, information on a call leg of a call, characteristics of a media session for a call leg of a call and knowledge of an association of the call legs for each call.

The embodiments include computer readable medium having stored thereon a plurality of instructions, the plurality of instructions including instructions which, when executed by a processor, cause the processor to perform the embodied telecommunication methods for processing a session initiated protocol (SIP) message to a third party application server.

Figure 3:
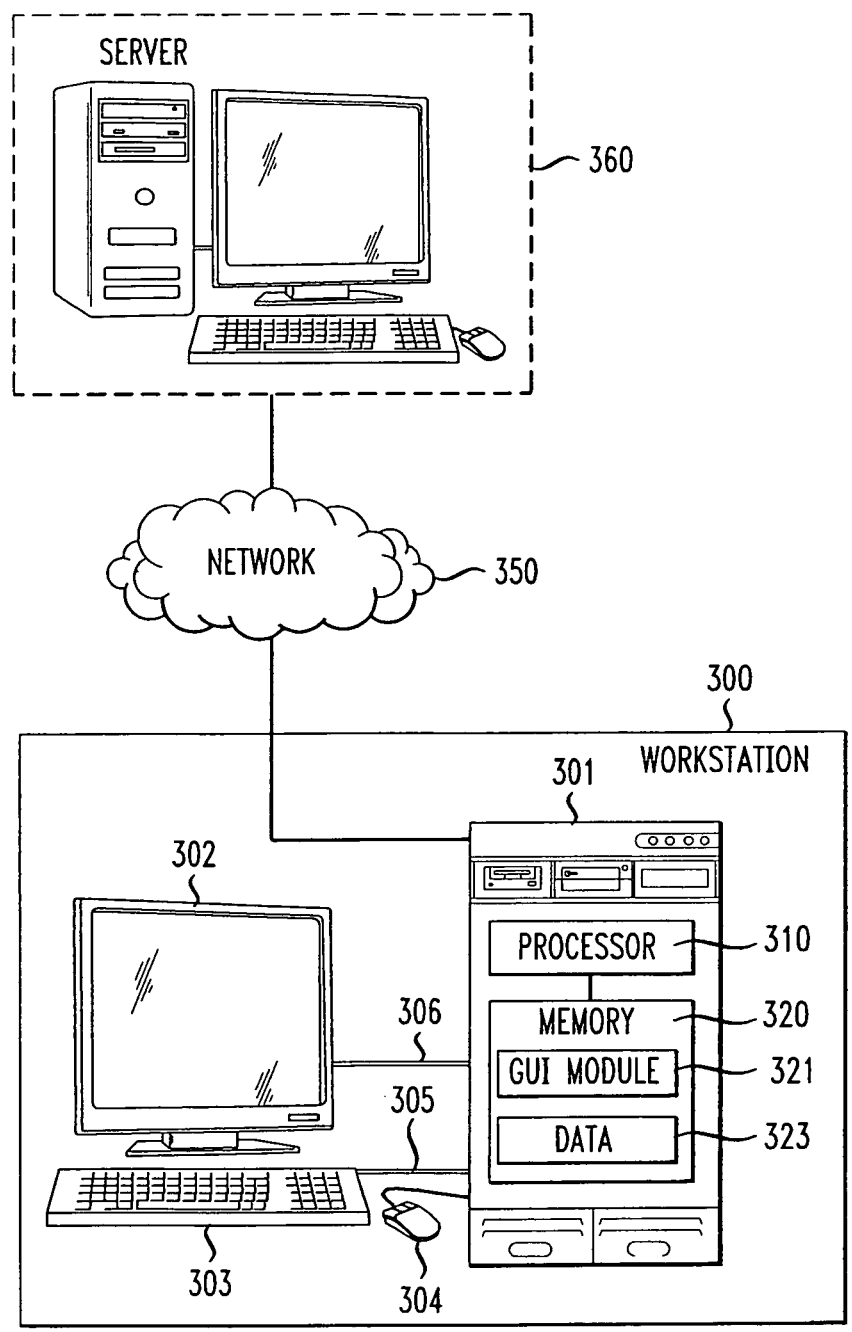
FIG. 3 depicts an illustration of a computer system to perform the embodied methods.

FIG. 3 depicts an illustration of a computer system to perform the embodied methods. A workstation (300) includes computer (301), which can be coupled to a video display (302) via an external graphics bus (306). The external graphics bus (306) can be an Advanced Graphics Port (AGP) compliant bus. The term "coupled" encompasses a direct connection, an indirect connection, or the like. Computer (301) in one embodiment includes a processor (310), such as the Pentium™ III processor manufactured by Intel Corp. of Santa Clara, Calif. In another embodiment, the processor (310) can be an Application Specific Integrated Circuit (ASIC). Computer (301) can include a memory (320) coupled to the processor. Memory (320) encompasses devices adapted to store digital information, such as Dynamic Random Access Memory (DRAM), Rambus™ DRAM (RDRAM), flash memory, a hard disk, an optical digital storage device, a combination thereof, etc. The computer (301) can be coupled to a keyboard (303) and a mouse (304) via an external computer bus (305). In one embodiment, the external computer bus (305) is a Universal Serial Bus (USB) compliant bus.

Memory (320) can include instructions adapted to be executed by the processor (310) to perform a method in accordance with an embodiment of the present invention. The term "instructions adapted to be executed" is meant to encompass any instructions that are ready to be executed in their present form (for example, machine code) by a processor, or require further manipulation (for example, compilation, decryption, decoding, or provided with an access code, etc.) to be ready to be executed by a processor (for example, processor (310). In one embodiment, the memory (320) can include a graphical user interface (GUI) module (321) to implement a graphical user interface.

In another embodiment, the workstation (300) is coupled to a server (360) via a network (350). Examples of network (350) include the internet, a WAN (wide area network), LAN (local area network), an intranet, a communications network, a computer network, a combination thereof, etc. In one embodiment, the server (360) is coupled to a storage device that typically stores data on a magnetic medium such as a magnetic disk. For example, the storage device may store application programs and associated data files/documents. Examples of documents include word processing documents, spreadsheet documents, HTML (Hypertext Markup Language) documents, and the like. Workstation (300) can access data stored in the storage device via server (360) and network (350). In an embodiment, server (360) can display information on display (302) by sending information signals to workstation (300) via network (350). Examples of display information include data a GUI component, a web page, and the like.

Data (323) can encompass hierarchical data, non-hierarchical data, and the like. Data (323) can be a document corresponding to a particular application such as a word processing document, a spreadsheet document, an HTML document, and the like.

Computer instructions adapted to be executed by a processor to perform the embodied methods are stored on a computer-readable medium and distributed as software. The computer-readable medium can be a device that stores digital information. For example, a computer-readable medium includes a portable magnetic disk, such as a floppy disk; or a Zip™ disk, manufactured by the Iomega Corporation of Roy, Utah (Zip™ is a registered trademark of Iomega Corporation); or a Compact Disk Read Only Memory (CD-ROM) as is known in the art for distributing software. The computer-readable medium can be distributed to a user that has a processor suitable for executing instructions adapted to be executed.

While these embodiments have been described with emphasis on the embodiments, it can be understood that within the scope of the appended claims, the embodiments might be practiced other than as specifically described herein.

What is claimed is:

1. A telecommunication method for processing a session initiation protocol message, comprising:
   receiving, via a processor of an intelligent application call control of an external application gateway, the session initiation protocol message from a call control element of a packet network;
   modifying, via the processor, the session initiation protocol message by removing proprietary network information and inserting a call identifier;
   translating, via the processor, an address related to the session initiation protocol message to an authorized protocol address;
   creating, via the processor, call state information for the session initiation protocol message received from the call control element;
   sending, via the processor, the session initiation protocol message with the call identifier and call state information to a third party application server;
   confirming, via the processor, that a second session initiation protocol message that is received is from the third party application server;
   confirming, via the processor, that the second session initiation protocol message is an allowed message type with allowed information;
   associating, via the processor, an existing call known by the call control element with the call identifier; and
   creating, via the processor, call information on the existing call and inserting the call information in the second session initiation protocol message.

2. The method of claim 1, further comprising:
   denying an acceptance of a second session initiation protocol message from a source unknown to the intelligent application call control.

3. The method of claim 1, further comprising:
   determining the allowed message type by using business agreements of users in the packet network indicating allowed message types.

4. The method of claim 1, wherein the call information is selected from a group consisting of call detail information, signal history information, encapsulated integrated service network information, and combinations thereof.

5. The method of claim 1, further comprising:
   translating an address related to the second session initiation protocol message to the authorized protocol address.

6. The method of claim 5, wherein the translating the address is performed using internet protocol information from a media description of the second session initiation protocol message.

7. The method of claim 1, wherein the intelligent application call control uses a control that controls requests by the third party application server to perform a dual tone multi-frequency data analysis of the existing call.

8. The method of claim 1, wherein the intelligent application call control uses traffic based controls.

9. The method of claim 8, wherein the traffic based controls are call leg based.

10. A non-transitory computer readable medium storing a plurality of instructions which, when executed by a processor of an intelligent application call control of an external application gateway, cause the processor to perform operations for processing a session initiation protocol message, the operations comprising:
   receiving the session initiation protocol message from a call control element of a packet network;
   modifying the session initiation protocol message by removing proprietary network information and inserting a call identifier;
   translating an address related to the session initiation protocol message to an authorized protocol address;
   creating call state information for the session initiation protocol message received from the call control element;
   sending the session initiation protocol message with the call identifier and call state information to a third party application server;
   confirming that a second session initiation protocol message that is received is from the third party application server;
   confirming that the second session initiation protocol message is an allowed message type with allowed information;
   associating an existing call known by the call control element with the call identifier; and
   creating call information on the existing call and inserting the call information in the second session initiation protocol message.

* * * * *